(12) United States Patent
Aberl et al.

(10) Patent No.: US 7,085,325 B2
(45) Date of Patent: Aug. 1, 2006

(54) SERIAL INTERFACE UNIT WITH TRANSMIT MONITOR

(75) Inventors: Peter Aberl, Bundesrepublik (DE); Ralf Eckhardt, Bundesrepublik (DE)

(73) Assignee: Texas Instruments Incorporated, Dallas, TX (US)

( * ) Notice: Subject to any disclaimer, the term of this patent is extended or adjusted under 35 U.S.C. 154(b) by 793 days.

(21) Appl. No.: 10/224,193

(22) Filed: Aug. 20, 2002

(65) Prior Publication Data

US 2003/0053547 A1    Mar. 20, 2003

(30) Foreign Application Priority Data

Aug. 22, 2001    (DE) ................. 101 41 040

(51) Int. Cl.
*H04B 3/00*    (2006.01)

(52) U.S. Cl. .......................... 375/257; 327/59

(58) Field of Classification Search ............... 375/224, 375/228, 257, 295; 714/704; 327/59
See application file for complete search history.

(56) References Cited

U.S. PATENT DOCUMENTS

| 4,104,582 A | | 8/1978 | Lambertsen |
| 4,816,703 A | * | 3/1989 | Sterling et al. ............. 375/257 |
| 5,751,746 A | | 5/1998 | Strauss |
| 5,914,965 A | * | 6/1999 | Gauthier et al. ............ 714/704 |
| 6,215,817 B1 | * | 4/2001 | Kimura ...................... 375/220 |
| 6,487,250 B1 | * | 11/2002 | Kato et al. .................. 375/257 |

FOREIGN PATENT DOCUMENTS

| DE | 2656911 | 8/1977 |
| DE | 4421083 | 12/1995 |

* cited by examiner

*Primary Examiner*—Khanh Tran
(74) *Attorney, Agent, or Firm*—Robert D. Marshall, Jr.; W. James Brady; Frederick J. Telecky, Jr.

(57) ABSTRACT

In a serial interface unit (10) for the transmission and reception of data under the control of clock signals, the data are output from a data source to a data output (24) via an output driver (22). A transmit monitor (52) compares the data supplied by the data source with the data received at the data output (24) via the output driver (22). The transmit monitor outputs an error signal when the data so compared do not coincide.

3 Claims, 2 Drawing Sheets

US 7,085,325 B2

SERIAL INTERFACE UNIT WITH TRANSMIT MONITOR

CLAIM OF PRIORITY

This application claims priority from German Patent Application No. 10141040.9 filed Aug. 22, 2001.

TECHNICAL FIELD OF THE INVENTION

The invention relates to a serial interface unit for the transmission and reception of data under the control of clock signals, whereby the data are transmitted from a data source to a data output via an output driver.

BACKGROUND OF THE INVENTION

In order to transfer data between individual units of a data-processing system, such as a processor unit and a peripheral unit, the individual units are each provided with serial interface units via which the data can be transmitted and from which the data can be received. The data transfer is thereby synchronous, which means that one of the units involved, the so-called master unit, generates a clock signal which, for the purpose of controlling the corresponding data transfer process, is passed on to the units connected to the system. In the specific technical literature, a serial interface unit of this type is known as an SPI (for serial peripheral interface). Such an interface unit is provided with a transmit shift register from which the data are serially transmitted to a data output via an output driver. The data output is then connected to the data input of the peripheral unit for which the data are meant. For the purpose of receiving the data, the serial interface unit contains a receive shift register into which the data received at a data input are fed serially. The serial data thereby come from the data output of that serial interface unit of the peripheral unit to which they were applied from its transmit shift register via an output driver.

To ensure a correct data transfer, extensive handshaking procedures and checksum transfers are currently carried out, whereby the receiver of the corresponding data must confirm that the data have been correctly received by returning a corresponding acknowledge message. These procedures necessitate an increased expenditure in terms of hardware and software for the units involved in the transfer of the data, and the volume of the transferred data is furthermore increased. All these factors contribute to a reduction of the attainable data transmission speed.

SUMMARY OF THE INVENTION

The invention is based on the requirement of providing a serial interface unit of the afore-described type, where the accuracy of the transferred data can be monitored without great outlay and without impairment of the attainable data transfer speed. According to the invention, this requirement is satisfied in that a transmit monitor is provided, which compares the data supplied by the data source with the data applied to the data output by the output driver, and which outputs an error signal when the compared data do not coincide.

The transmit monitor provided in the serial interface unit according to the invention can continuously monitor whether the data to be transferred coincide with the data which actually appear at the data output and therefore at the connection line to the receiver of the data. Should errors occur in the transfer path, the transmit monitor can recognize these and indicate this in a suitable way.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
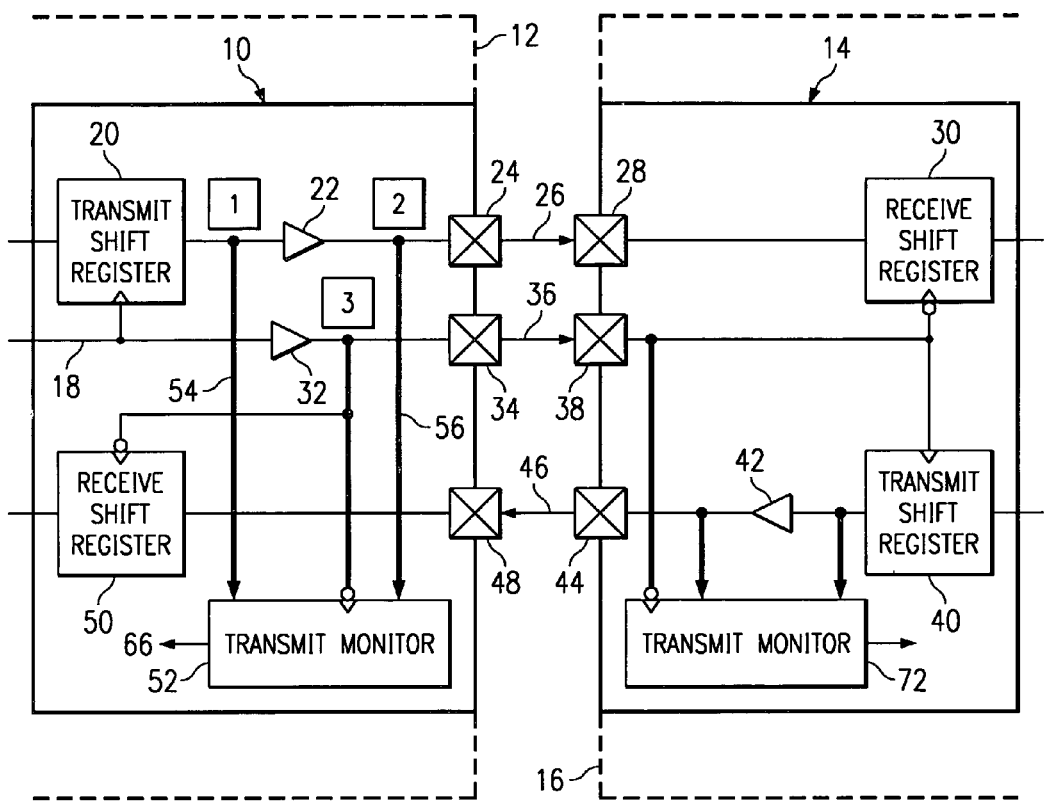
FIG. 1 is a schematic representation of the serial interface units, according to the invention, which are contained in both the processor unit and in a peripheral unit.

FIG. 1 shows an interface unit 10, which is part of a processor unit 12, here only represented in schematic form. FIG. 1 also illustrates a further interface unit 14, which is part of a peripheral unit 16, here also represented in schematic form only. Processor unit 12 generates the clock signals, which are required for the data transfer, and supplies them to a clock bus 18. The processor unit 12 therefore acts as the master unit. Peripheral unit 16 acts as a slave unit and does not generate its own clock signal but as far as the data transfer is concerned, peripheral unit 16 is also controlled by the clock signal from the processor unit 12.

The interface unit 10 contains a transmit shift register 20 to which the data to be transferred are applied by the processor unit 12. Under control of the clock signal, transmit shift register 20 supplies data to a data output 24 via an output driver 22. Data input 28 of the interface unit 14 receives this data via a bus 26. Under the control of the clock signal, this data is supplied to a receive shift register 30. The data is then available for further processing by the peripheral unit 16.

As can be seen, the clock signals are also applied to the clock output 34 via an output driver 32, then to a clock input 38 of the interface unit 14 via a bus 36. The interface unit 14 also contains a transmit shift register 40, the data contents of which can be supplied under clock control to a data output 44 via an output driver 42. This data is supplied under clock control via a bus line 46 to the data output 44, the data input 48 of the interface unit 10 and then to a receive shift register 50 within processor unit 12.

Figure 2:
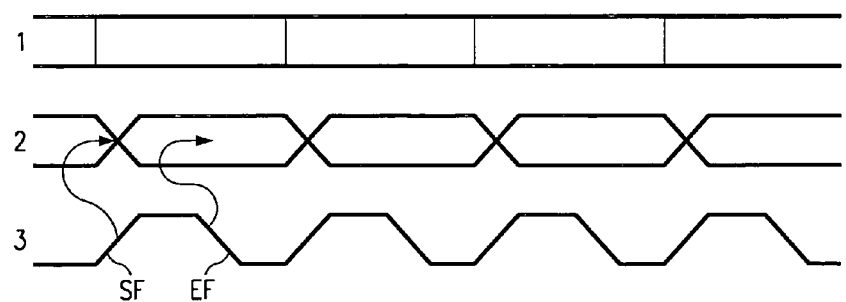
FIG. 2 is a signal diagram to illustrate a data transfer process between the processor unit and the peripheral unit, without interference.

FIG. 2 illustrates an example data transfer process from the processor unit 12 to the peripheral unit 16. FIG. 2 shows waveforms 1, 2 and 3 of the signals present at the corresponding points 1, 2 and 3 of FIG. 1. This type of transfer takes place under the control of the clock signal present at point 3. Both the sending and the receiving processes are slope-controlled. Transmission takes place at the rising slope SF and reception occurs at the falling slope EF. To give an example, assume a high-value bit is output by the transmit shift register 20 at the first transmit slope SF and applied to the data output 24 via the output driver 22. The bit transmitted to the data input 28 of the peripheral unit 16 via the bus line 26 is shifted with the receive slope EF into the receive shift register 30 in the read process. The signal present at point 1 of the interface unit 10, before the output driver 22 and the signal present at point 2, after the output driver 22, are supplied to a transmit monitor 52 contained in the interface unit 10. Transmit monitor 52 compares these two signals and outputs an error signal at its output 66 if the two signals do not coincide during the receive slope EF of the clock signal, that is during the time for reading of the transferred signal by the receive shift register 30 of the peripheral unit 16. Should an error occur in the connection path between point 2 within the interface unit 10 and the receive shift register 30 of the interface unit 14, changing the value of the data signal presently transferred, this can be detected by the transmit monitor 52. Suitable measures may be taken to ensure accurate transfer of the data signal upon generation of his error signal. Suitable measures may include requesting a repeat transmission.

Figure 3:
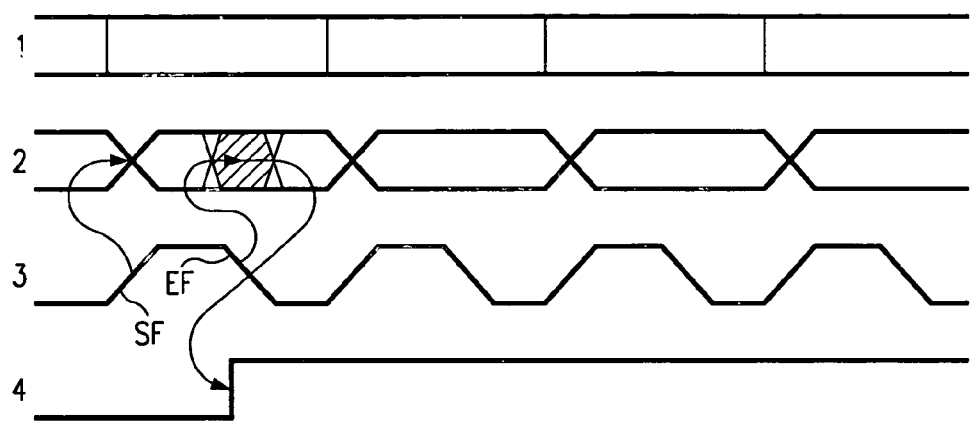
FIG. 3 is a signal diagram to illustrate a data transfer process between the processor unit and the peripheral unit, when interference is present.

FIG. 3 illustrates a similar signal diagram in the case where an interference has occurred during the receive slope EF of the clock signal. Thus the data signal at point 2 has a different signal value from that of the data signal at point 1 supplied to the input of output driver 22 by the transmit shift register 20 due to interference during the transmit slope SF of the clock signal. In this case, the signals compared by the transmit monitor 52 do not coincide, causing a corresponding error signal at output 66 (point 4 of FIG. 4).

The interface unit 14 in the peripheral unit 16 also contains a transmit monitor 72, which monitors the transfer of data from the peripheral unit 16 via the interface unit 14 to the interface unit 10 of the processor unit 12. The data transfer processes from the peripheral unit 16 to the processor unit 12 take place in the same way as the transfer processes from the processor unit 12 to the peripheral unit 16. The only difference consists in that the processor unit 12, as the master unit, supplies the necessary clock signals for the transfer processes to the slave peripheral unit 16.

Figure 4:
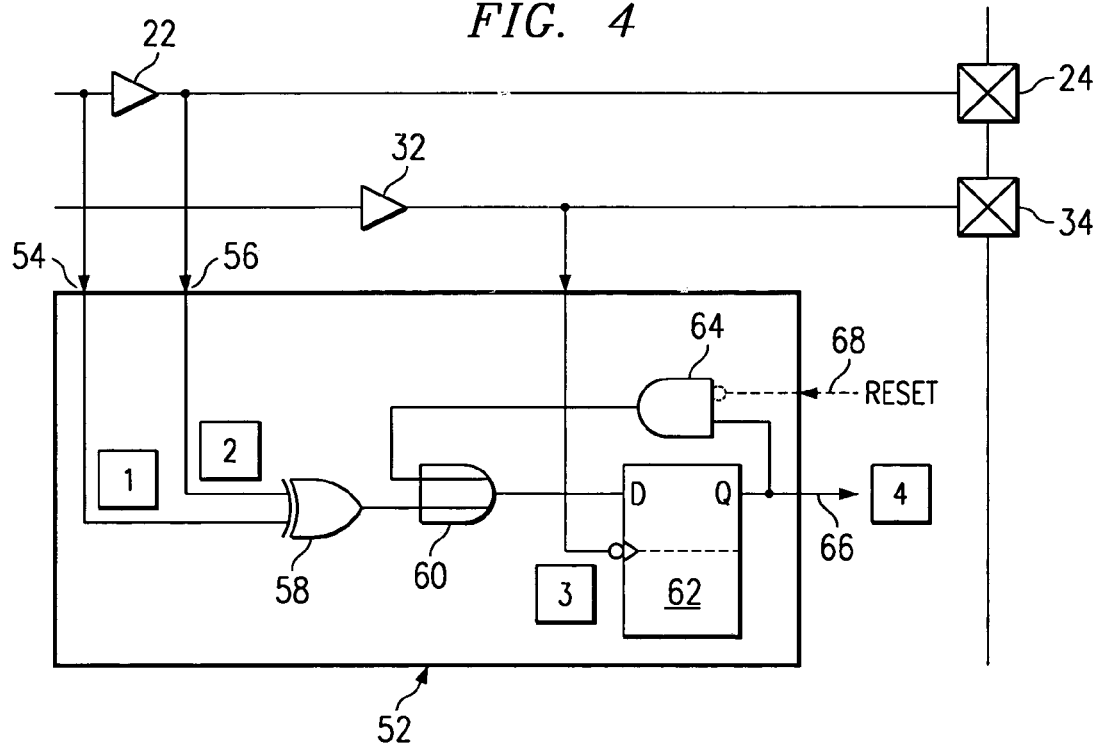
FIG. 4 is an example of the embodiment of a transmit monitor.

FIG. 4 illustrates the construction and the mode of operation of the transmit monitor 52. The transmit monitor 52 receives at its input 54 the data signal supplied by the transmit shift register 20 to the input of the output driver 22. The transmit monitor 52 receives at its input 56 the data signal supplied by the output driver 22 to the data output 24. The two signals to be compared are applied to the two inputs of an exclusive-or circuit 58. If the signals applied to the inputs of exclusive-or circuit 58 have different values, because of the assumed interference situation, then it outputs a high-value signal. The signal output by the exclusive-or circuit 58 is supplied to the input D of the D flip-flop 62 via the OR circuit 60. D flip-flop 62 accepts this input signal under the control of the clock signal. This means that at the output Q of the D flip-flop 62 generates a signal corresponding to the value of the output signal of the exclusive-or circuit 58. This is a high value output indicating the existing error condition. The output signal of the D flip-flop 62 is returned via an AND circuit 64 and the OR circuit 60 to the input D of the D flip-flop 62. This latches the output Q as a signal of high value, indicating an error condition, until a RESET signal is applied to a second inverting input 68 of the AND circuit 64 to indicate that the error signal has been read.

The transmit monitor ensures to a large degree of certainty that any error occurring during the data transfer can be detected. This takes place without there being any need to transmit additional data, exclusively required for copy error checking, in addition to the actual data to be transferred.

What is claimed is:

1. A serial interface unit for the transmission and reception of data comprising:
    a data source (20) supplying serial output data a single bit at a time;
    an output driver (22) having an input (1) receiving the serial data and an output (2) supplying a data output line (26); and
    a transmit monitor (52) connected to the output driver (22), said transmit monitor (52) comparing data at said input (1) of said output driver (22) and data at said output (2) of said output driver (22) and generating an error signal when the compared data do not coincide, said transmit monitor (52) including
        an exclusive-OR circuit (58) with a first input connected to said input (1) of said output driver (22), a second input connected to said output (2) of said output driver (22) and an output, and
        a D flip-flop (62) having a D input connected to said output of said exclusive-OR circuit (58) and an output, said D flip-flop (62) temporarily storing the output said exclusive-OR circuit (58).

2. The serial interface unit according to claim 1, wherein: said transmit monitor (52) further includes
    a first AND circuit (60) having a first input connected to said output of said exclusive-OR circuit, a second input and an output connected to said D input of said D flip-flop (62), said first AND circuit (60) forming a connection between said output of said exclusive-OR circuit (58) and said D input of said D flip-flop (62),
    a second AND circuit (64) having a first input connected to said output of said D flip-flop (62), a second inverting input receiving a RESET input and an output connected to said second input of said first AND circuit (60);
    whereby said D flip-flop (62) stores said output of said exclusive-OR circuit (58) until said second inverting input of said second AND circuit (64) receives said RESET signal.

3. The serial interface unit according to claim 1, further comprising:
    a clock signal input receiving a clock signal supplied to a clock signal line and to said transmit monitor circuit; and
    said transmit monitor is responsive to said clock signal for comparing data at said input (1) of said output driver (22) and data at said output (2) of said output driver (22) at a time relative to said clock signal during which a receive serial interface unit (14) samples data on said data output line (26).

* * * * *